United States Patent
Fougeray et al.

[15] 3,679,342
[45] July 25, 1972

[54] DIPPING FORM FOR MAKING SKIN-TYPE ARTICLES FROM PLASTIC MATERIAL

[72] Inventors: Jean Henri Roger Fougeray, 11 rue Charles Floquet, Rueil-Malmaison; Louis Henri Jules Giffard, 33 rue de la Mission Marchand, 92 Courbevoie, both of France

[22] Filed: June 8, 1970

[21] Appl. No.: 44,497

[30] Foreign Application Priority Data

June 6, 1969 France....................................6918731

[52] U.S. Cl............................................425/275, 264/306
[51] Int. Cl........................................................B28b 21/46
[58] Field of Search........................18/2 K, 24, 41; 264/306; 118/505; 425/269, 270, 275

[56] References Cited

UNITED STATES PATENTS

| | | |
|---|---|---|
| 2,058,552 | 10/1936 | Becher et al...............................18/41 |
| 2,639,751 | 5/1953 | Flaherty............................118/505 UX |
| 2,840,039 | 6/1958 | Darnell et al............................118/505 |
| 2,959,152 | 11/1960 | Byers et al..............................118/505 |
| 3,130,078 | 4/1964 | Lewis et al..............................118/505 |
| 3,496,265 | 2/1970 | Anglada et al.........................264/306 |
| 3,496,610 | 2/1970 | Shelby et al. ..............................18/41 |
| 3,544,668 | 12/1970 | Dereniuk...........................264/306 X |

*Primary Examiner*—R. Spencer Annear
*Attorney*—Nolte and Nolte

[57] ABSTRACT

In the manufacture of skin-type articles by dipping a hot former into a fluidized bath of powdered thermoplastic material, adhesion of said material on said former is locally prevented for providing neat edges, holes and other discontinuities in the article and thus facilitating the stripping of the former and avoiding any need of manual intervention for finishing the article.

1 Claim, 3 Drawing Figures

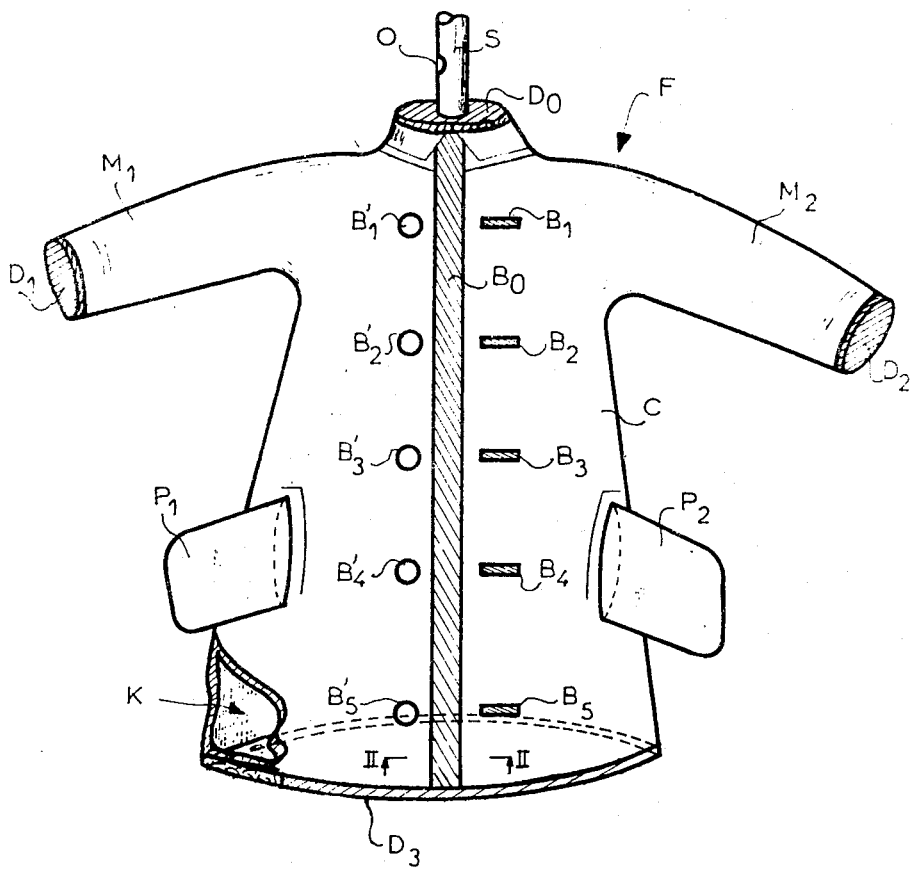
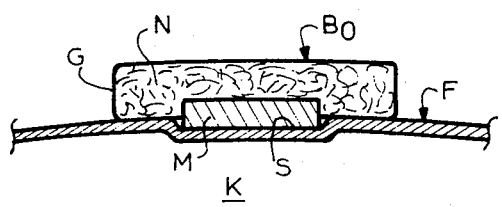

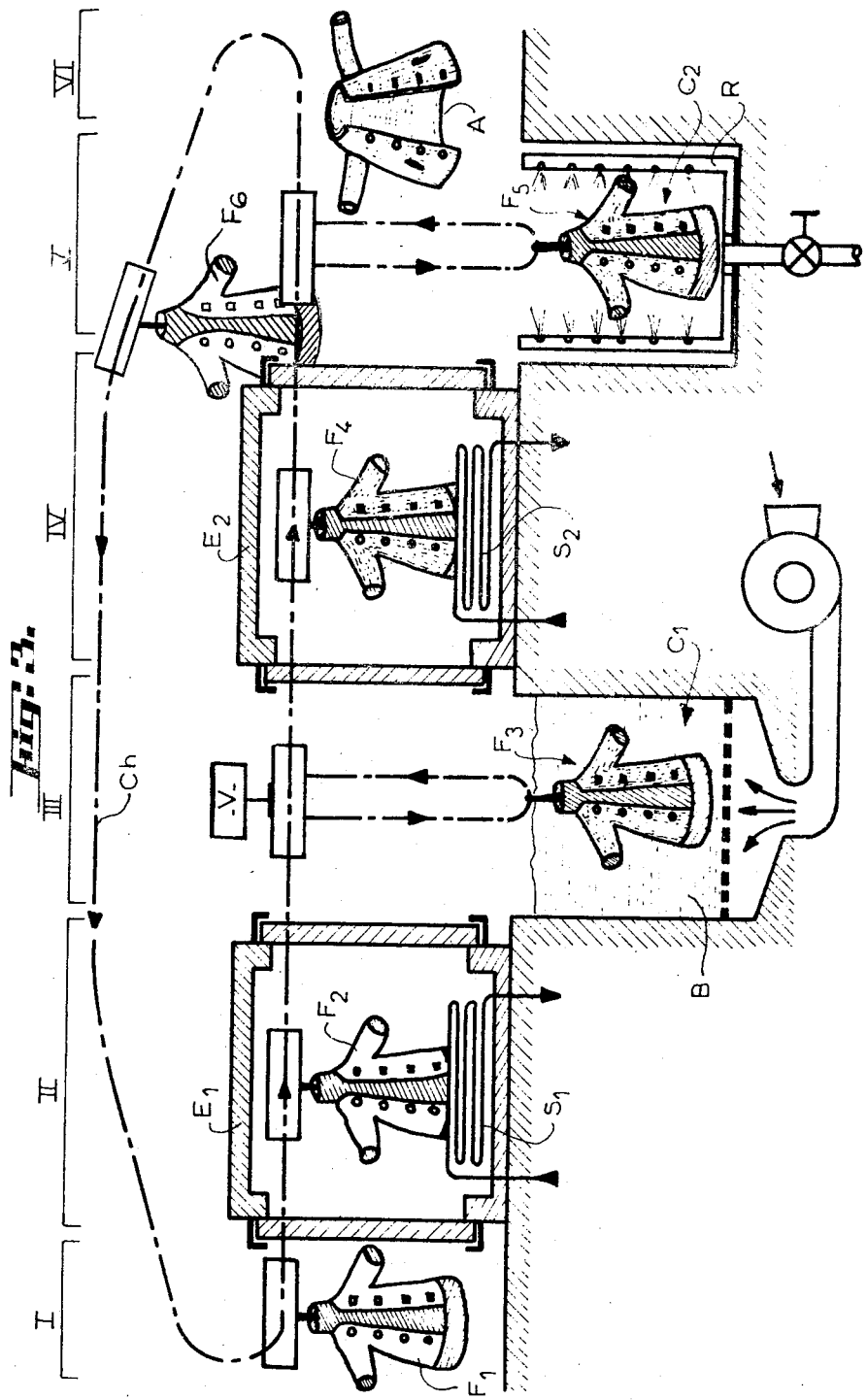

DIPPING FORM FOR MAKING SKIN-TYPE ARTICLES FROM PLASTIC MATERIAL

The present invention relates broadly to the manufacture of skin-type articles made from thermoplastic material through the so-called dip moulding process and is more particularly concerned with improvements of such a method of manufacture and to devices for carrying same out and adapted to directly obtain finished articles that do not require any finishing work and possibly comprise holes, void spaces and other discontinuities.

It has been known for a long time to make in one piece articles such as rain garments, high boots, carpets for cars and other industrial products consisting of a single suitably shaped skin or film of plastic material provided by dipping into a fluidized bath of powdery thermoplastic material a previously heated former which, after withdrawal from the bath and cooling is freed from the continuous skin formed on its surface through agglomeration of said material. This process of manufacture however has the inconvenience of producing articles necessarily made in one piece which on the one hand are devoid of any holes except for the corresponding opening at the upper portion of the former or of its support which is not being immersed and which on the other hand are badly shaped and exhibit many defects along said opening; therefore after having been got off the former usually with some difficulties, such articles must undergo further subsequent shaping steps adapted to provide them with neat edges and/or to shape the slits, openings and other like holes that they have to be formed with. Moreover, the bad configuration of the edge of said opening results in skin fragments left adhering to the former upon removal or recovering of the moulded article so that it is necessary to undertake a thorough cleaning of the former before its being used again. For these various grounds, the prior known manufacturing process not only restricts the variety of skin-like articles likely to be produced but is still difficult to be carried out by automatic means when taking into account the manual working steps required for the preparation of the former and for the final shaping of the moulded article.

The essential object of the present invention is to obviate the inconveniences of the method of manufacture known in the prior state of the art by providing improvements enabling the production on or by means of one and a same former of one or several articles of any configuration posSibly provided with holes and removing any need of manual intervention at the beginning as well as at the end of the manufacturing process.

For this purpose the method according to the invention is characterized in particular in that it consists in locally preventing the adherence of the powdery material to said former so as to obtain at least one skin-like article with clean edges or borders possibly comprising holes.

To this end the adhesion of the powdery material onto the former is prevented by a local thermal insulation and/or by a local coating or lining of the surface of said former.

According to a further characterizing feature of the process according to the invention, said former is subjected at least after its withdrawal from said bath to the action of shocks or vibrations causing the powdery non-adherent material to be shaken off.

It appears obviously from the preceding characterizing features that the method according to the invention enables to provide into the skin or film of plastic material built up onto the surface of the former, discontinuities or other holes with clean edges allowing the simultaneous manufacture of several skin-like articles on a same former and/or the obtainment of finished articles that need not be retouched in any way after having been stripped off; moreover, due to the removal of non-adherent powdery material, no cleaning of the former is required with a view to use it again.

The invention is also concerned with a former for carrying out said method and characterized in particular in that it consists of a preferably metallic and hollow body the continuous surface of which is locally provided with an anti-sticky and/or heat insulating lining or coating.

This lining consists desirably of strips or plates of heat insulating material such as asbestos fiber board secured onto the surface of the former and preferably provided with an impervious sheathing, cover or like wrapping made for example from aluminum foils or sheets.

Said strips or plates may be fastened onto the surface of the former by sticking or gluing or any other means of permanent connection; they are preferably attached by means of removable fasteners and for example by means of magnets embedded or integrated therein.

According to an alternative embodiment, said lining consists of a local coating of the surface of the former with an anti-sticky and/or thermally insulating material.

The invention further relates to an arrangement or plant for carrying out said method, characterized in that it comprises in combination at least one former pre-heating station such as an oven or drying closet, a moulding station comprising a pit wherein a fluidized bed of powdery thermoplastic material is kept up and a stripping station for the article after cooling, the travelling of the former between said stations being effected by a conveyor device comprising lifting means for dipping said former into the fluidized bath or bed and means for stirring, shaking or vibrating said former upon its withdrawal from the bath.

Said arrangement desirably comprises in addition a smoothing of sleeking station consisting of an oven or a drying cabinet through which the former travels after its withdrawal from the bath.

Finally the invention is also concerned with the articles obtained through said method and/or by means of said former and arrangement, such an article being characterized in particular in that it comprises clean edges and possibly slits, openings or other holes directly formed by moulding.

Further characterizing features and advantages of the invention will appear more clearly when reading the following descriptive specification with reference to the accompanying drawings wherein:

FIG. 1 shows a former according to the invention for moulding a rain-coat or work-clothes;

FIG. 2 is a partial cross-section taken at a larger scale upon the line II—II of FIG. 1; and FIG. 3 is a lay-out diagram showing the situation of a plant according to the invention.

In FIG. 1 has been shown by way of a non-limiting example of applying the invention, a former for dip moulding a rain-coat or work-apparel made in one seamless piece and therefore quite fluid-tight. This former F comprises a body C shaped as a frustum of a cone provided with symmetrical projections M1, M2 and P1, P2 corresponding to the sleeves and to the pockets turned inside/out, respectively, of the garment or attire to be moulded. The body C and its projections are desirably built by welding together deep drawn steel sheet parts so as to achieve a thin and continuous wall defining an inner fluid-tight cavity K vented to the atmosphere for example by means of an opening O formed in the tubular hanger member S integrally connected to the top end of the former F.

The former F so obtained is adapted to be dipped into a fluidized bed of powdery thermoplastic material after having been previously heated up to a temperature of about from 300° to 400° C.; as the former F is thus immersed in the fluidized bath, the powdery thermoplastic material forming the latter agglomerates onto the surface of said former into a continuous skin or film the thickness of which depends among other parameters on the nature of the thermoplastic material, its grain size, the temperature of the former and the time during which the latter is immersed in the bath. After removal of the former F from the fluidized bath and cooling of the built-up skin, the latter is stripped off and is shaped into the finished article according to the conventional dip moulding processes.

According to the invention, any working step for shaping the stripped off skin may be dispensed with or omitted through thermal insulation and/or local lining of the surface of the former F so as to locally avoid the adhesion of the powdered thermoplastic material hence to produce hollows or holes within the skin material built up on the surface of the former F, the distribution of which holes is of course designed with a view on the one hand to facilitate the stripping of the skin-like article and on the other hand to dispense with any need for shaping said article after having been stripped off.

Thus the former F shown in FIG. 1 is locally provided with adhesion preventing and heat insulating linings or coatings the distribution of which corresponds to the nature of the moulded article; in the example of embodiment illustrated in FIG. 1, the former F is thus provided with linings D0 and D3 covering the small base and the great base, respectively, of the body C and with linings D1 and D2 covering the ends of the sleeves M1 and M2; moreover the former F is provided with a lining B0 having the shape of a strip arranged along one of the generating lines of the body C and with lining B1-B5 distributed along one side of the strip B0 and adapted to form button-holes corresponding to buttons B'1-B'5 directly moulded on the opposite side of the strip B0.

FIG. 2 shows a further possible embodiment of the strip B0 also applicable to other adhesion preventing and heat insulating linings fitting the former F. As shown in this Figure the strip B0 consists essentially of a core N made from asbestos fiber board, glass fibers or any other equivalent material surrounded by a continuous sheath, casing or wrapping G made for example from an aluminum foil or sheet. The strip B0 may be held in place for example through magnetic attraction and for this purpose a magnet M consisting of a strip of elastomeric material containing magnetized iron oxide particles is embedded in the core N of the strip B0. This kind of attachment is of course applicable only when the former F consists of a magnetic material; alternatively the strip B0 could be secured to the former F for example by sticking or gluing or by means of resilient clips. In any case the former F is desirably provided with a groove or like recess S defining the location for attaching the strip B0. The other lining elements of the former F are fastened by similar means.

In FIG. 3 is diagrammatically shown an arrangement or factory plant according to the invention for dip moulding skin-like articles by means of formers F of the kind shown in FIG. 1. This plant running or working in continuous operation comprises a chain conveyor CH with which formers F are successively fed to working stations I to VI in each one of which is carried out at least one of the manufacturing process steps according to the invention. Thus at the working station I, a clean, cold former F1 provided with its adhesion preventing fittings is held over at the inlet of a drying chamber or insulated enclosed space E1 forming the working station II and wherein a former F2 is heated to a temperature ranging from about 300° to 400° C. by means of a heating coil S1 or any other suitable heating means. The warm or hot formers F coming out from the drying closet E1 are conveyed to the working station III where is carried out the dipping operation. Thus has been shown in FIG. 3 a former F3 dipped into a vat or tank C1 wherein is kept up a fluidized bath B of powdered thermoplastic material; while being dipped and when leaving the bath B, the former F3 is subjected to shocks and/or vibrations by means of a vibrator V in order to cause the building up of a uniform coating on any part of the former and to shake off particles of non-adhesive plastics material. The former are then moved into a second drying chamber E2 which is kept at a temperature of about 150° to 200° C. by means of a heating coil S2 or any other heating means in order to cause the smoothing or sleeking and glazing of the outer face of the skin of thermoplastic material built up on the former F4. Upon moving out from the drying closet E2, the formers are conveyed to the working station V where they are lowered into a vat or tank C2 provided with sets or rows of sprinkling or spraying nozzles R for cooling them quickly. The formers are then conveyed to the working station VI where the finished articles A are stripped off; this stripping off may be effected manually in the simple and quick manner owing to the configuration of the article A obtained and to the absence of any burrs or the like on the former F6. The staying time of the formers at each one of the working stations I to VI as well as the heating and smoothing temperatures depend of course upon many parameters and in particular upon the nature of the thermoplastic material used, the configuration of the article to be made and the desired skin thickness. The various process steps of the method of manufacture are desirably controlled and operated jointly by an automatic control device monitoring the operation of all the elements of the plant.

It should be understood that the invention is not at all limited to the forms of embodiments described and shown which have been given by way of example only. Accordingly the invention comprises all the means forming technical equivalents to those described and illustrated as well as their combinations carried out in accordance with the gist and scope of the appended claims.

What is claimed is:

1. Former for manufacturing skin-type article by a dip moulding process including the steps of heating said former before immersing same in a fluidized bath of powdery plastic material, cooling said former after it is withdrawn from said bath, and freeing said former from the film-like skin built-up onto its surface through agglomeration of said material, characterized in that said former consists of a hollow metallic body, the continuous outer surface of which is locally covered with lining means made of plates of heat insulating material such as asbestos fiber board provided with an impervious sheath made from aluminum foil to prevent the adhesion of said powdery material, said lining means being secured and arranged on the surface of said former so that said film-like skin forms at least one finished skin-type article provided with clean edges possibly delineating holes, void areas and other discontinuities.

* * * * *